United States Patent
Ihara

(10) Patent No.: US 10,676,642 B2
(45) Date of Patent: Jun. 9, 2020

(54) CROSSLINKED ORGANOPOLYSILOXANE AND METHOD FOR PRODUCING SAME, MIST SUPPRESSANT, AND SOLVENT-FREE SILICONE COMPOSITION FOR RELEASE PAPER

(71) Applicant: SHIN-ETSU CHEMICAL CO., LTD., Tokyo (JP)

(72) Inventor: Toshiaki Ihara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 63 days.

(21) Appl. No.: 15/994,587

(22) Filed: May 31, 2018

(65) Prior Publication Data

US 2018/0273692 A1 Sep. 27, 2018

Related U.S. Application Data

(62) Division of application No. 15/320,386, filed as application No. PCT/JP2015/066207 on Jun. 4, 2015, now Pat. No. 10,113,036.

(30) Foreign Application Priority Data

Jun. 23, 2014 (JP) ................. 2014-128294

(51) Int. Cl.
| | |
|---|---|
| *C09D 183/04* | (2006.01) |
| *C09D 7/65* | (2018.01) |
| *C08G 77/12* | (2006.01) |
| *C08G 77/38* | (2006.01) |
| *C08G 77/50* | (2006.01) |
| *C08L 83/14* | (2006.01) |
| *C09D 183/14* | (2006.01) |
| *C08G 77/20* | (2006.01) |
| *C08G 77/00* | (2006.01) |

(52) U.S. Cl.
CPC ........... *C09D 183/04* (2013.01); *C08G 77/12* (2013.01); *C08G 77/38* (2013.01); *C08G 77/50* (2013.01); *C08L 83/14* (2013.01); *C09D 7/65* (2018.01); *C09D 183/14* (2013.01); *C08G 77/20* (2013.01); *C08G 77/70* (2013.01); *C09J 2483/005* (2013.01)

(58) Field of Classification Search
USPC .................................................... 528/10–43
See application file for complete search history.

(56) References Cited

U.S. PATENT DOCUMENTS

| | | | |
|---|---|---|---|
| 6,586,535 B1 | 7/2003 | Clark et al. | |
| 6,774,201 B2 | 8/2004 | Kilgour et al. | |
| 6,805,914 B2 | 10/2004 | Clark et al. | |
| 6,887,949 B2 | 5/2005 | Kilgour et al. | |
| 7,135,512 B2 | 11/2006 | Kilgour et al. | |
| 7,314,770 B2 * | 1/2008 | Boardman | ............... C08L 83/04 257/E21.352 |
| 7,560,167 B2 | 7/2009 | Schlitzer et al. | |
| 2008/0058479 A1 | 3/2008 | Schlitzer et al. | |
| 2008/0281055 A1 | 11/2008 | Schlitzer et al. | |
| 2011/0287267 A1 | 11/2011 | Hori et al. | |
| 2012/0220549 A1 | 8/2012 | Starch et al. | |
| 2015/0104601 A1 * | 4/2015 | Appeaning | ............... C09J 7/385 428/41.4 |

FOREIGN PATENT DOCUMENTS

| | | |
|---|---|---|
| JP | 2005-343974 A | 12/2005 |
| JP | 2006-506509 A | 2/2006 |
| JP | 2008-506510 A | 2/2006 |
| JP | 2006-508206 A | 3/2006 |
| JP | 2006-290919 A | 10/2006 |
| JP | 2010-502778 A | 1/2010 |
| JP | 2010-150537 A | 7/2010 |
| JP | 5033293 B2 | 9/2012 |
| JP | 5033294 B2 | 9/2012 |

OTHER PUBLICATIONS

"Silicones: An Introduction to Their Chemisty and Applications" G.G. Freeman, published by the Chapel River Press Ltd, 1962, 4 pages.
International Search Report for PCT/JP2015/066207 dated Jul. 7, 2015.
Written Opinion of the International Searching Authority for PCT/JP2015/066207 (PCT/ISA/237) dated Jul. 7, 2015.

* cited by examiner

*Primary Examiner* — Marc S Zimmer
(74) *Attorney, Agent, or Firm* — Birch, Stewart, Kolasch & Birch, LLP

(57) ABSTRACT

Provided are: a crosslinked organopolysiloxane which has properties intermediate between a dimethylpolysiloxane oil and a gel-like crosslinked siloxane; and a method for producing the crosslinked organopolysiloxane. An oil-like organopolysiloxane which is produced by: adding a compound having a siloxane unit represented by formula (3) to a gel-like silicone, wherein the gel-like silicone is produced by a hydrosilylation reaction of an organopolysiloxane having an alkenyl group with an organohydrogenpolysiloxane having a hydrogen atom bonded to a silicon atom in the presence of a platinum-group metal catalyst; and then equilibrating the resultant product with an acid or alkali catalyst.

$$R^1{}_2SiO_{2/2} \quad (3)$$

($R^1$ represents a group selected from a monovalent hydrocarbon group having no aliphatic unsaturated bond and an alkenyl group represented by the formula: $-(CH_2)_a-CH=CH_2$ (wherein a represents a numerical value of 0 to 6), and the average polymerization degree of formula (3) is 3 to 2,000).

5 Claims, No Drawings

CROSSLINKED ORGANOPOLYSILOXANE AND METHOD FOR PRODUCING SAME, MIST SUPPRESSANT, AND SOLVENT-FREE SILICONE COMPOSITION FOR RELEASE PAPER

CROSS-REFERENCE TO RELATED APPLICATIONS

This application is a Divisional of copending application Ser. No. 15/320,386, filed on Dec. 20, 2016, which was filed as PCT International Application No. PCT/JP2015/066207 on Jun. 4, 2015, which claims the benefit under 35 U.S.C. § 119(a) to Patent Application No. 2014-128294, filed in Japan on Jun. 23, 2014, all of which are hereby expressly incorporated by reference into the present application.

TECHNICAL FIELD

This invention relates to a crosslinked organopolysiloxane and to a method for producing the same. The invention also relates to a mist suppressant for use such as by addition in order to reduce the amount of mist generated by the coater head when coating a solventless silicone composition for release paper onto a paper, plastic film or other base material with a high-speed roller, and to a solventless silicone composition for release paper formulated with this mist suppressant.

BACKGROUND ART

Gel-like crosslinked organopolysiloxanes are used, for example, in cosmetics and in junction coatings for electrical wiring, but are all solid substances that lack flowability. Hence, they do not dissolve in solvents and so a long grinding operation is required to formulate these in cosmetics or resins.

Silicone oil dispersions of silicone gels are used in cosmetics. Such products are obtained by first creating a solid silicone gel via an addition reaction, and then grinding up the gel while dispersing it in a silicone oil. This production method is troublesome to carry out. Moreover, in the solid silicone gel, even if unreacted functional groups are present near the regions that have become solid due to the reaction, the reaction proceeds no further. As a result, even when the same starting materials are used, the crosslink density differs each time that production is carried out, making the physical properties difficult to control.

In plastics, a silicone oil or silicone gum having a high degree of polymerization is dispersed in the resin and used to increase the flowability during molding or for such purposes as to prevent blemishes or to confer slip properties. Silicone oils with a low degree of polymerization have a flowability increasing effect and exhibit excellent slip properties, but because the silicone oil bleeds out onto the surface, the surface becomes slippery. Hence, gum-like silicones having a high degree of polymerization are used, but it takes a lot of trouble to uniformly disperse such silicones, such as by masterbatching beforehand.

Moreover, because most of the silicone added gets buried within the resin, only a portion takes part in action at the surface, resulting in a poor efficiency. On the other hand, when a solid silicone gel or resin is used, given the many ingredients that accumulate within the resin and also their poor compatibility with the resin, dispersion is poor, which often lowers the mechanical strength. Moreover, the surface modifying effects are poor.

No methods for synthesizing compounds having physical properties intermediate to those of silicone gels and silicone oils have been reported in the literature.

Also, in order to prevent bonding and sticking between base materials of paper, plastic or the like and pressure-sensitive adhesive materials, a cured film of a organopolysiloxane composition has hitherto been formed on the surface of the base material, thereby imparting release properties. The method of forming a peelable film by an addition reaction provides excellent curability and can accommodate a variety of peeling property requirements ranging from low-speed peeling to high-speed peeling, and thus is widely used as a method of forming a cured film of organopolysiloxane on a base material surface.

The types of organopolysiloxane compositions used in this method of forming a peelable film by an addition reaction include one type obtained by dissolving an organopolysiloxane composition in an organic solvent, another type obtained by dispersing an organopolysiloxane composition in water using an emulsifying agent so as to form an emulsion, and a solventless type in which the composition consists solely of organopolysiloxane. However, because the solvent type has the drawback of being harmful to the human body or the environment, from the standpoint of safety, a switch is underway from solvent-type compositions to solventless-type compositions. Also, because solvent-type and emulsion-type compositions require the removal of solvent or water at the time of application, the transfer roller used for application cannot be set to a high speed. In addition, in solvent-type compositions, high-speed application is impossible owing also to the danger of ignition. In the case of solventless-type compositions, because there is no solvent to be removed by evaporation and the flash point is high, during mass production, high-speed application is carried out, increasing the productivity. However, when carrying out the high-speed application of solventless-type compositions, misting arises. The various mist suppressants mentioned below have been proposed in order to solve this problem of misting.

The mist suppressant in JP-A 2006-290919 (Patent Document 1) is the product of a condensation reaction between a diorganopolysiloxane capped at both ends with silanol groups and an organohydrogenpolysiloxane using a tin catalyst.

The condensation reaction is difficult to control and so there are marked differences by lot in the degree of polymerization of the reaction product. Although the mist-suppressing effect increases at a higher degree of polymerization, a gel-like product forms, making mixture into a silicone for release paper difficult. Conversely, at a low degree of polymerization, mixture into silicone for release paper is easy, but the mist-suppressing effect decreases and the migration of unreacted product sometimes occurs, which may result in a lower peel strength. Also, a concern with tin catalysts is their toxicity; when used in addition-curable silicone compositions for release paper, they act as poisons for platinum catalysts and inhibit curing, making their use undesirable.

The mist suppressants in JP Nos. 5033293 and 5033294 (Patent Documents 2 and 3) are obtained by adding, to a solventless silicone composition for release paper, a compound prepared by reacting beforehand, in the presence of a platinum catalyst or the like, a mixture wherein either an alkenyl group-containing siloxane or an organohydrogenpolysiloxane is present in large excess (SiH group/alkenyl group ratio is at least 4.6, or alkenyl group/SiH group ratio is at least 4.6). These patent publications relate to addition reaction products endowed with a mist-suppressing effect; having one of the starting materials be present in a large excess lowers the molecular weight of the addition reaction product, enabling the viscosity to be held down. Also, following the cure, surplus functional groups react with the silicone composition for release paper, suppressing migration.

However, due to the platinum catalyst that remains within the mist suppressant, when the SiH group/alkenyl group ratio is 4.6 or more, there is a high danger of dehydrogenation occurring over time. This may also have an influence on the cure, and irregularities in the crosslink density depending on the site may arise. On the other hand, when the alkenyl group/SiH group ratio is 4.6 or more, the SiH group/alkenyl group ratio of the silicone for release paper becomes low and the crosslink density changes, resulting in a change in peel strength.

The mist suppressant in JP-A 2006-506509 (Patent Document 4) is a compound obtained by partially crosslinking a vinyl group-containing MQ resin with a partially substituted hydrido-silicone produced by incompletely reacting a long-chain olefin with an organohydrido-silicon compound.

Patent Document 4 sets out to render a Q unit-containing siloxane into an oil-like substance. When MQ units are added to an organohydrido-silicon compound, depending on the lot, gelling sometimes arises even when the formulation is the same, thus making the viscosity difficult to control. Also, in the addition reaction, the degree of conversion for the vinyl group-containing MQ resin is low and, following reaction completion, the reaction sometimes proceeds over time, resulting in a higher viscosity. On trying to increase the degree of conversion for the vinyl group-containing MQ resin in the addition reaction, the amount of platinum catalyst rises, making it impossible to include the mist suppressant beforehand in the silicone composition for release paper and worsening the pot life even when the mist suppressant is added at the time of use.

JP-A 2006-506510 and JP-A 2006-508206 (Patent Documents 5 and 6) relate to star-branched polymers as mist suppressants for coatings. Star-branched polymers are reaction products obtained by adding a vinylsiloxane or an unsaturated functional group-containing organic compound to the product of an addition reaction between a modified organohydrogenpolysiloxane having silicon-bonded hydrogen atoms and a Q unit ($SiO_{4/2}$ unit)-containing vinylsiloxane.

A gel tends to form in these reaction products and, depending on the adhesiveness and olefin chain effects, the peel strength sometimes becomes high.

The mist suppressant of JP-A 2010-150537 (Patent Document 7), which is included in a silicone composition for release paper, is a polymer obtained by an equilibration reaction between a branched organopolysiloxane oligomer containing Q units ($SiO_{4/2}$ units) and a diorganosiloxane oligomer.

A Q unit-containing organopolysiloxane oligomer is difficult to produce while controlling the molecular weight, and so there is a large disparity by lot in the molecular weight. Hence, effecting uniform dispersion by equilibration is difficult, and constantly obtaining a uniform equilibrated compound is a challenge.

JP-A 2010-502778 (Patent Document 8) includes, as a mist suppressant in a silicone-based coating ingredient (silicone composition for release paper), a branched polysiloxane component produced from a copolymer of: (a) an organosilicon compound having at least two unsaturated hydrocarbon functional groups per molecule and (b) an organosilicon compound having at least two silyl hydride functional groups per molecule.

This reaction product often forms a gel, and the presence of a silicone gel gives rise to surface irregularities and unevenness in the coating film. Also, because platinum catalyst remains in the branched polysiloxane component, when silyl hydride functional groups remain within the branched polysiloxane component, dehydrogenation reactions arise during storage, as a result of which the container may swell or, in extreme cases, burst. Moreover, in formulations where the amount of regulator is low, this sometimes causes addition reactions to arise in the silicone-based coating ingredient during dispersion.

PRIOR ART DOCUMENTS

Patent Documents

Patent Document 1: JP-A 2006-290919
Patent Document 2: JP No. 5033293
Patent Document 3: JP No. 5033294
Patent Document 4: JP-A 2006-506509
Patent Document 5: JP-A 2006-506510
Patent Document 6: JP-A 2006-508206
Patent Document 7: JP-A 2010-150537
Patent Document 8: JP-A 2010-502778

SUMMARY OF THE INVENTION

Problems to be Solved by the Invention

In light of the above, the object of this invention is to provide a crosslinked organopolysiloxane which exhibits physical properties intermediate to those of a dimethylpolysiloxane oil and a gel-like crosslinked siloxane. Another object is to provide a method for producing such a crosslinked organopolysiloxane.

Further objects of the invention are to provide a mist suppressant which is an additive for reducing the amount of mist generated when a solventless silicone composition for release paper is applied onto the roller of a coating machine and transferred by rotating the roller at high speed, and a solventless silicone composition for release paper to which this mist suppressant has been added.

Means for Solving the Problems

The inventor has conducted extensive investigations in order to achieve the above objects. As a result, he has discovered that a crosslinked organopolysiloxane which has flowability and exhibits physical properties intermediate to those of an oil and a gel can be stably produced from an oil-like organopolysiloxane prepared by adding a compound having siloxane units of formula (3) below to a gel-like silicone obtained by a hydrosilylation reaction between an organopolysiloxane having at least two alkenyl groups per molecule and an organohydrogenpolysiloxane having at least two silicone-bonded hydrogen atoms per molecule in the presence of a platinum group metal catalyst, and equilibrating with an acid or alkaline catalyst.

The inventor also noticed that when the gel-like silicone prior to equilibration is formulated in a solventless silicone composition for release paper, the mist suppressing effect is high, but the presence of gel-like silicone tends to give rise to surface unevenness of the coating film and coating irregularities, resulting in a separator that is commercially worthless.

On the other hand, in the above addition product, when an oil-like product having few crosslink sites was used, the mist suppressing effect was confirmed to be low, yet an excellent mist suppressing effect was obtained by adding the crosslinked organopolysiloxane to a solventless silicone composition for release paper.

$$R^1_2SiO_{2/2} \quad (3)$$

In formula (3), each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (where the subscript "a" is 0 or an integer from 1 to 6). The average degree of polymerization of the siloxane of formula (3) is from 3 to 2,000.

Accordingly, the invention provides the following crosslinked organopolysiloxane and method of preparation thereof, and also provides the following mist suppressant and solventless silicone composition for release paper.

[1] A crosslinked organopolysiloxane comprising an organopolysiloxane which contains 0.1 to 50 moles of silethylene linkages per 1,000 moles of siloxane units and is obtained by adding, to a gel-like silicone prepared by hydrosilylation of an organopolysiloxane having a structure of formula (1) below with an organohydrogenpolysiloxane having a structure of formula (2) below $$M_\alpha M^{Vi}_\beta D_\gamma D^{Vi}_\delta T_\epsilon T^{Vi}_\zeta Q_\eta \quad (1)$$

$$M_\theta M^H_\iota D_\kappa D^H_\lambda T_\mu T^H_\nu \quad (2)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha$, $\beta$, $\gamma$, $\delta$, $\epsilon$, $\zeta$, $\eta$, $\theta$, $\iota$, $\kappa$, $\lambda$, $\mu$, and $\nu$ are each independently 0 or a positive number, with the provisos that $\beta$, $\delta$ and $\zeta$ are not all 0, $\beta+\delta+\zeta\geq 2$, $\iota$, $\lambda$ and $\nu$ are not all 0, and $\iota+\lambda+\nu\geq 2$), a compound having siloxane units of formula (3) below $$R^1_2SiO_{2/2} \quad (3)$$

(wherein each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (where "a" is 0 or an integer from 1 to 6); and an average degree of polymerization of the siloxane of formula (3) is from 3 to 2,000 in the compound having siloxane units of formula (3)) and carrying out equilibration.

[2] The crosslinked organopolysiloxane of [1] wherein, in formula (1), $1\leq\alpha+\gamma+\epsilon+\eta\leq 1,000\leq 1,000$ and, in formula (2), $1\leq\theta+\kappa+\mu\leq 200$.

[3] The crosslinked organopolysiloxane of [2] wherein, in formula (1), $1\leq\gamma\leq 1,000$ and, in formula (2), $1\leq\kappa\leq 200$.

[4] The crosslinked organopolysiloxane of any one of [1] to [3], wherein the compound having siloxane units of formula (3) is an organosiloxane selected from among octamethyltetrasiloxane, decamethylpentasiloxane, linear siloxanes of the formula $M_2D_n$ (M being an $R_3SiO_{1/2}$ unit, D being an $R_2SiO_{2/2}$ unit, each R being independently an unsubstituted or substituted monovalent hydrocarbon group of 1 to 12 carbon atoms which has no aliphatic unsaturated bonds, and n being an integer from 0 to 200) and branched siloxanes of the formula $M_{2+m}D_nT_m$ (M, D and n being the same as above, T being an $RSiO_{3/2}$ unit, R being the same as above, and m being an integer from 1 to 10).

[5] The crosslinked organopolysiloxane of any one of [1] to [4], wherein the organopolysiloxane of formula (1) has a weight-average molecular weight of 260 to 74,186 and the organohydrogenpolysiloxane of formula (2) has a weight-average molecular weight of 208 to 14,934.

[6] A siloxane composition obtained by diluting the crosslinked organopolysiloxane of any one of [1] to [5] with a low-viscosity organopolysiloxane having a viscosity at 25° C. of 1 to 400 mPa·s.

[7] A mist suppressant comprising the crosslinked organopolysiloxane of any one of [1] to [5] or the siloxane composition of [6].

[8] A solventless silicone composition for release paper, comprising:

(A) 100 parts by weight of an organopolysiloxane having two or more silicon-bonded alkenyl groups per molecule, (B) 0.1 to 30 parts by weight of an organohydrogenpolysiloxane having three or more silicon-bonded hydrogen atoms per molecule, (C) a catalytic amount of a platinum group metal catalyst, and (D) 0.01 to 20 parts by weight of the mist suppressant of [7].

[9] A method of producing a crosslinked organopolysiloxane, comprising the steps of preparing a gel-like silicone by hydrosilylation of an organopolysiloxane having the structure of formula (1) below with an organohydrogenpolysiloxane having the structure of formula (2) below $$M_\alpha M^{Vi}_\beta D_\gamma D^{Vi}_\delta T_\epsilon T^{Vi}_\zeta Q_\eta \quad (1)$$

$$M_\theta M^H_\iota D_\kappa D^H_\lambda T_\mu T^H_\nu \quad (2)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha$, $\beta$, $\gamma$, $\delta$, $\epsilon$, $\zeta$, $\eta$, $\theta$, $\iota$, $\kappa$, $\lambda$, $\mu$, and $\nu$ are each independently 0 or a positive number, with the provisos that $\beta$, $\delta$ and are not all 0, $\beta+\delta+\zeta\geq 2$, $\iota$, and $\nu$ are not all 0, and $\iota+\lambda+\nu\geq 2$); and subsequently adding to the gel-like silicone a compound having siloxane units of formula (3) below $$R^1_2SiO_{2/2} \quad (3)$$

(wherein each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (where "a" is 0 or an integer from 1 to 6; and an average degree of polymerization of the siloxane of formula (3) is from 3 to 2,000 in the compound having siloxane units of formula (3)) and carrying out equilibration so as to obtain an organopolysiloxane which contains 0.1 to 50 moles of silethylene linkages per 1,000 moles of siloxane units.

Advantageous Effects of the Invention

The crosslinked organopolysiloxane of the invention has physical properties intermediate between those of a dimethylsilicone oil and a gel-like crosslinked siloxane, can be suitably used in various applications, such as silicone gels for cosmetics, and is particularly effective as a mist suppressant.

The mist suppressant of the invention, when added in a small amount to a solventless silicone composition for release paper, enables the amount of mist generated when transfer is carried out by the high-speed rotation of a roller to be greatly reduced.

Moreover, because the mist suppressant of the invention contains no solid gel and does not include an active platinum group metal catalyst, even when mixed with an organohydrogenpolysiloxane having silicon-bonded hydrogen atoms, dehydrogenation does not arise and there is no crosslink reaction-promoting effect over time. In addition, the mist suppressant has an excellent mist suppressing effect.

EMBODIMENT FOR CARRYING OUT THE INVENTION

The crosslinked organopolysiloxane of the invention consists of an organopolysiloxane (V) which contains 0.1 to 50 moles of silethylene linkages per 1,000 moles of siloxane units and is obtained by adding a compound (IV) having siloxane units of formula (3) below to a gel-like silicone (III) prepared by hydrosilylation of an organopolysiloxane (I) having a structure of formula (1) below and an organohydrogenpolysiloxane (II) having a structure of formula (2) below, and carrying out equilibration.

$$M_\alpha M^{Vi}_\beta D_\gamma D^{Vi}_\delta T_\epsilon T^{Vi}_\zeta Q_\eta \quad (1)$$

$$M_\theta M^{H}_\iota D_\kappa D^{H}_\lambda T_\mu T^{H}_\nu \quad (2)$$

In formulas (1) and (2), M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^{H}$ is $R_2HSiO_{1/2}$, $D^{H}$ is $RHSiO_{2/2}$, $T^{H}$ is $HSiO_{3/2}$ and Q is $SiO_{4/2}$. Each R is independently an unsubstituted or substituted monovalent hydrocarbon group of 1 to 12 carbon atoms that has no aliphatic unsaturated bonds, and P is an alkenyl group represented by —$(CH_2)_a$—CH=$CH_2$ (wherein "a" is 0 or an integer from 1 to 6). Also, α, β, □, δ, ε, ζ, η, θ, ι, κ, λ, and ν are each independently 0 or a positive number, with the provisos that β, δ and ζ are not all 0, β+δ+ζ≥2, ι, λ, and ν are not all 0, and ι+λ+ν≥2.

$$R^1_2SiO_{2/2} \quad (3)$$

In formula (3), each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (wherein "a" is 0 or an integer from 1 to 6). The siloxane of formula (3) has an average degree of polymerization of from 3 to 2,000.

First, the organopolysiloxane (I) having a structure of formula (1) below and the organohydrogenpolysiloxane (II) having a structure of formula (2) below are described.

$$M_\alpha M^{Vi}_\beta D_\gamma D^{Vi}_\delta T_\epsilon T^{Vi}_\zeta Q_\eta \quad (1)$$

$$M_\theta M^{H}_\iota D_\kappa D^{H}_\lambda T_\mu T^{H}_\nu \quad (2)$$

In formulas (1) and (2), M, $M^{Vi}$, D, $D^{Vi}$, T, $T^{Vi}$, $M^{H}$, $D^{H}$, $T^{H}$ and Q are respectively the units shown below.

M: $R_3SiO_{1/2}$,
$M^{Vi}$: $R_2PSiO_{1/2}$,
D: $R_2SiO_{2/2}$,
$D^{Vi}$: $RPSiO_{2/2}$,
T: $RSiO_{3/2}$,
$T^{Vi}$: $PSiO_{3/2}$,
$M^{H}$: $R_2HSiO_{1/2}$,
$D^{H}$: $RHSiO_{2/2}$,
$T^{H}$: $HSiO_{3/2}$,
Q: $SiO_{4/2}$.

In these formulas, each R is independently an unsubstituted or substituted monovalent hydrocarbon group of 1 to 12 carbon atoms, and preferably 1 to 6 carbon atoms, which has no aliphatic unsaturated bonds. Illustrative examples include alkyl groups such as methyl, ethyl, propyl, butyl, pentyl, hexyl, octyl, decyl and dodecyl groups; cycloalkyl groups such as a cyclohexyl group; aryl groups such as phenyl, naphthyl and tolyl groups; and any of these groups in which some portion of the hydrogen atoms bonded to carbon atoms are substituted with halogen atoms, cyano groups, hydroxyl groups or the like. However, to lower the peel strength, it is preferable for at least 50 mol % of the total number of R groups to be methyl groups.

P is an alkenyl group represented by —$(CH_2)_a$—CH=$CH_2$ (wherein "a" is 0 or an integer from 1 to 6), and is preferably —CH=$CH_2$.

α, β, γ, δ, ε, ζ, η, θ, ι, κ, λ, ι and ν are each independently 0 or a positive number. Here, β, δ and are not all 0; the sum β+δ+ζ is 2 or more, preferably 2 to 10, and more preferably 2 to 5; ι, λ and ν are not all 0; and the sum ι+λ+ν is 2 or more, preferably 2 to 10, and more preferably 2 to 5.

Also, α, γ, ε and η are not all 0 and, particularly from the standpoint of the content of silethylene linkages, the sum α+γ+ε+η is preferably 1 to 1,000, more preferably 10 to 500, and even more preferably 50 to 400. Here, from the standpoint of the content of silethylene linkages, γ in particular is preferably 1 to 1,000, more preferably 10 to 500, and even more preferably 50 to 400. In addition, a is preferably 0 to 20, more preferably from 0 to 10, and especially 0 to 5; ε is preferably 0 to 50, and especially 0 to 10; and η is preferably 0 to 5, and especially 0 to 1.

In addition, θ, κ and μ are not all 0 and, similarly, from the standpoint of the content of silethylene linkages, the sum θ+κ+μ is preferably 1 to 200, more preferably 10 to 150, and even more preferably 20 to 100. Here, κ is preferably 1 to 200, more preferably 10 to 150, and even more preferably 20 to 100; θ is preferably 0 to 20, more preferably 0 to 10, and especially 0 to 5; and μ is preferably 0 to 50, and especially 0 to 10.

The organopolysiloxane (I) of formula (1) is an organopolysiloxane having at least 2, and preferably from 2 to 10, silicon-bonded vinyl groups per molecule.

The weight-average molecular weight of this organopolysiloxane is preferably from 260 to 74,186, and more preferably from 408 to 7,586. When the weight-average molecular weight is too small, the alkali equilibration reaction following the addition reaction may not fully proceed; on the other hand, when it is too large, the gel may be soft and sticky, making it difficult to handle. Here and below, the weight-average molecular weight can be measured as the polystyrene-equivalent weight-average molecular weight by gel permeation chromatographic (GPC) analysis (solvent: toluene).

Specific examples of such organopolysiloxanes (1) include siloxanes having alkenyl groups at both ends, siloxanes having alkenyl groups on side chains, siloxanes having alkenyl groups at one end and on side chains, siloxanes having alkenyl groups at both ends and on side chains, and siloxanes having alkenyl groups at branched ends.

Expressed in terms of structural formulas, examples include $M^{Vi}_2D\gamma$, $M_2D\gamma D^{Vi}_\delta$, $M^{Vi}_3D\gamma T_1$, $M^{Vi}_4D\gamma T_2$, $M^{Vi}_2D\gamma D^{Vi}_\delta$, $M^{Vi}_2D\gamma Q_1$ and $M_\alpha D\gamma D^{Vi}_\delta T^{Vi}_\zeta$ (wherein γ is 1 to 1,000, preferably 10 to 500, and especially 50 to 400; 6 is 2 to 20, preferably 2 to 10, and especially 2 to 5; and ζ is 1 to 20, preferably 1 to 10, and especially 1 to 6). More specific structural examples include $M^{Vi}_2D_{10}$, $M^{Vi}_2D_{100}$, $M_2D_{27}D^{Vi}_3$, $M_2D_{97}D^{Vi}_3$, $M_2D_{26}D^{Vi}_4$, $M_2D_{25}D^{Vi}_5$, $M_2D_{24}D^{Vi}_6$, $M_2D_{96}D^{Vi}_4$, $M_2D_{95}D^{Vi}_5$, $M^{Vi}_3D_{100}T_1$, $M^{Vi}_4D_{100}T_2$, $M^{Vi}_2D_{97}D^{Vi}_1$, $M^{Vi}_2D_{95}D^{Vi}_3$ and $M_3D_{93}D^{Vi}_3T^{Vi}_1$.

The vinyl group content (mol/g) is preferably in the range of 0.00001 to 0.01 mol/g, and more preferably in the range 0.0001 to 0.001 mol/g.

The organohydrogenpolysiloxane (11) of formula (2) is an organohydrogenpolysiloxane having at least 2, and preferably 2 to 100, silicon-bonded hydrogen atoms (SiH groups) per molecule. The gel-like silicone is formed by an addition reaction between the SiH groups on the organohydrogenpolysiloxane (II) and the vinyl groups on the organopolysiloxane (I).

The weight-average molecular weight of the organohydrogenpolysiloxane (II) is preferably from 208 to 14,934, and more preferably from 874 to 5,000. When the weight-average molecular weight is too small, the alkali equilibration reaction following the addition reaction may not fully proceed; when it is too large, the gel may be soft and sticky, making it difficult to handle.

Specific examples of such organohydrogenhpolysiloxanes (II) include siloxanes having hydrogen groups at both ends, siloxanes having hydrogen groups on side chains, siloxanes having hydrogen groups at one end and on side chains, siloxanes having hydrogen groups at both ends and on side chains, and siloxanes having hydrogen groups at both ends which are branched and on side chains.

Expressed in terms of structural formulas, examples include $M_2D^H_\gamma$, $M_2D_\kappa D^H$, $M^H_2D_\kappa D^H$, $M^H_3D_\kappa T_1$ and $M_\theta D_\kappa D^H_\lambda$, $T^H_\nu$ (wherein i is 1 to 200, preferably 10 to 150, and especially 20 to 100; X is 1 to 20, preferably 1 to 10, and especially 1 to 5; θ is 3 to 22, preferably 3 to 12, and especially 3 to 7; and ν is 1 to 20, preferably 1 to 10, and especially 1 to 5). More specific structural examples include $M^H_2D_{10}$, $M^H_2D_{100}$, $M_2D_{27}D^H_3$, $M_2D_{97}D^H_3$, $M_2D_{26}D^H_4$, $M_2D_{25}D^H_5$, $M_2D_{24}D^H_6$, $M_2D_{96}D^H_4$, $M_2D_{95}D^H_5$, $M^H_3D_{100}T_1$, $M^H_4D_{100}T_2$, $M^H_2D_{97}D^H_1$, $M^H_2D_{95}D^H_3$ and $M_3D_{93}D^H_3T^H_1$.

The SiH group content is preferably in the range of 0.0001 to 0.1 mol/g, and more preferably in the range 0.0001 to 0.01 mol/g.

The organohydrogenpolysiloxane (11) is used in an amount such that the molar ratio of SiH groups in the organohydrogenpolysiloxane to alkenyl groups in the organopolysiloxane of formula (1) (SiH groups:alkenyl groups) is preferably from 0.8:5 to 2:1, and more preferably from 1:1.5 to 1.5:1.

The gel-like silicone (III) which is the first-stage reaction product in the invention can be synthesized by using a platinum group metal catalyst to effect a hydrosilylation (addition) reaction between an organopolysiloxane (I) having a structure of above formula (1) and an organohydrogenpolysiloxane (II) having a structure of above formula (2). This is a reaction that adds SiH groups in the organohydrogenpolysiloxane (II) to vinyl groups in the organopolysiloxane (I) by means of a platinum group metal catalyst.

Here, known catalysts that are used as addition reaction catalysts may be used as the platinum group metal catalyst. Examples of such platinum group metal catalysts include platinum-based, palladium-based, rhodium-based and ruthenium-based catalysts. Of these, the use of a platinum-based catalyst is especially preferred. Examples of such platinum-based catalysts include chloroplatinic acid, alcohol solutions or aldehyde solutions of chloroplatinic acid, and complexes of chloroplatinic acid with various olefins or vinylsiloxanes.

These platinum group metal catalysts are added in a catalytic amount. In terms of economic considerations, the weight of the platinum group metal with respect to the combined amount of the organopolysiloxane (1) and the organohydrogenpolysiloxane (II) is preferably in the range of 0.1 to 100 ppm, and more preferably in the range of 0.5 to 5 ppm.

Synthesis of the gel-like silicone (111) serving as the intermediate in this invention may be carried out in the absence of solvent or with the use of a solvent capable of dissolving the organopolysiloxane, such as toluene. However, it is preferable to add a low-viscosity cyclic siloxane (such as octamethyltetrasiloxane or decamethylpentasiloxane) or linear diorganopolysiloxane serving as the subsequently described compound (IV) prior to the alkali equilibration step, and to use this as the solvent. Here, the amount of solvent used is preferably less than 7 times, more preferably not more than 6 times, and even more preferably not more than 5.5 times, the combined weight of the organopolysiloxane (I) having a structure of formula (1) and the organohydrogenpolysiloxane (11) having a structure of formula (2). When such a solvent is included, the amount is typically at least 0.5 time, and preferably at least 1 time, the combined weight.

Because the reaction due to hydrosilylation proceeds slowly at normal temperature, the reaction temperature is preferably from 50 to 140° C., and more preferably from 60 to 120° C., and the reaction time is preferably 1 to 8 hours, and more preferably 2 to 5 hours.

Next, an oil-like organopolysiloxane (V) can be obtained by further adding a compound (IV) having siloxane units of formula (3) to the gel-like silicone (III) obtained by the hydrosilylation reaction, and carrying out equilibration with an acid or alkaline catalyst.

$$R^1_2SiO_{2/2} \qquad (3)$$

In this formula, each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (wherein "a" is 0 or an integer from 1 to 6). The siloxane of formula (3) has an average degree of polymerization of 3 to 2,000.

Here, in formula (3), the monovalent hydrocarbon groups $R^1$ of 1 to 20 carbon atoms, and preferably 1 to 12 carbon atoms, which have no aliphatic unsaturated bonds are exemplified by alkyl groups such as methyl, ethyl, propyl, butyl, pentyl, hexyl, octyl, decyl and dodecyl groups; cycloalkyl groups such as a cyclohexyl group; aryl groups such as phenyl, naphthyl and tolyl groups; and any of these groups in which some portion of the hydrogen atoms bonded to the carbon atoms are substituted with halogen atoms, cyano groups, hydroxyl groups or the like. $R^1$ is preferably a methyl group.

The average degree of polymerization of compound (IV) having siloxane units of formula (3) is 3 to 2,000, and preferably 3 to 100. When the average degree of polymerization is below 3, the mist suppressing effect is low; when the average degree of polymerization is too large, the viscosity becomes too high, making the compound unfit for use. The average degree of polymerization can be determined as the polystyrene-equivalent weight-average degree of polymerization in GPC analysis (solvent: toluene).

In addition to siloxane units of formula (3), compound (IV) may also include ($R^{13}SiO_{1/2}$) structural units, ($R^1_1SiO_{3/2}$) structural units (wherein R is as defined above) and ($SiO_{4/2}$) structural units such that the combined amount thereof with respect to the weight of all the siloxane units is in the range of preferably 0 to 50 wt %, and more preferably 0 to 10 wt %.

Examples of compound (IV) having siloxane units of formula (3) include low-viscosity cyclic siloxanes such as octamethyltetrasiloxane and decamethylpentasiloxane, linear siloxanes such as $M_2D_n$ (wherein M and D are the same as above; and n is an integer from 0 to 200, and preferably from 1 to 50), and branched siloxanes such as $M_{2+m}D_nT_m$ (wherein M, D and T are the same as above; n is an integer from 0 to 200, and preferably from 1 to 50; and m is an integer from 1 to 10, and preferably from 1 to 3).

The amount in which compound (IV) having siloxane units of formula (3) is used should be an amount sufficient to render the gel-like silicone (11) produced by an addition reaction between an organopolysiloxane (I) having a structure of formula (1) and an organohydrogenpolysiloxane (II) having a structure of formula (2) into a liquid state, although this amount is preferably from 2 to 100 times, more preferably from 3 to 50 times, and even more preferably from 3 to 25 times, the number of parts by weight of the crosslinked reaction product of formulas (1) and (2).

As mentioned above, the compound (IV) having siloxane units of formula (3) may be added prior to the addition reaction; alternatively, it may be added after the addition reaction and alkali equilibration carried out.

An acid or alkali is used as the catalyst in the equilibration reaction. By using an acid catalyst or an alkaline catalyst, siloxane bonds having large ionicity can be cleaved and recombined, thereby enabling an equilibrated product to be obtained.

Examples of acid catalysts include sulfuric acid, hydrochloric acid, phosphoric acid, activated clay, iron chloride, boric acid, trifluoroacetic acid, methanesulfonic acid and trifluoromethanesulfonic acid.

Examples of alkaline catalysts include KOH, CsOH, NaOH, $(CH_3)_4NOH$, $(n-C_4H_9)_4POH$ and metal siliconates such as those of potassium or phosphorus.

In the case of harder gels in which the gel-like silicon (III) has a high crosslink density, the reaction is preferably carried out using an alkaline catalyst under a high temperature.

These catalysts are used in an amount of 10 to 3,000 ppm, and preferably 50 to 2,000 ppm.

This reaction by equilibration is preferably carried out at a reaction temperature of 10 to 160° C., especially 120 to 160° C., for a reaction time of 1 to 20 hours, especially 2 to 10 hours.

The resulting organopolysiloxane (V) (crosslinked organopolysiloxane) is an oil-like substance that contains no gel. The viscosity at 25° C. of this organopolysiloxane (V), as measured with a Brookfield rotational viscometer, is preferably from 50 to 100,000 mPa·s, and more preferably from 100 to 50,000 mPa·s.

The resulting organopolysiloxane (V) has a silethylene linkage content per 1,000 moles of siloxane units, as determined by $^1$H-NMR, of from 0.1 to 50 moles, and preferably from 1 to 30 moles. When the silethylene linkage content is too low, a mist suppressing effect is not observable; when this content is too high, the viscosity becomes too high, making mixture difficult.

When the organopolysiloxane (V) (crosslinked organopolysiloxane) has a high viscosity, a siloxane composition of the organopolysiloxane (V) diluted with a low-viscosity organopolysiloxane can be prepared. The viscosity in this case may be set to from 100 to 200,000 mPa·s, and especially 100 to 10,000 mPa·s. Here, the viscosity is the value at 25° C. measured with a Brookfield rotational viscosity (the same applies below).

The low-viscosity organopolysiloxane used for dilution is preferably a low-viscosity organopolysiloxane which may include unsaturated groups and has a viscosity at 25° C. of preferably from 1 to 400 mPa·s, and more preferably from 10 to 200 mPa·s.

Examples of such low-viscosity organopolysiloxanes include dimethylpolysiloxanes having a viscosity of from 1 to 400 mPa·s, dimethylpolysiloxanes having dimethylvinylsiloxy groups at both ends of the molecular chain, methylvinylpolysiloxanes having pendant vinyl groups, dimethylpolysiloxanes having dimethylhydroxysilyl groups at both ends, and phenylmethylpolysiloxanes having pendant phenyl groups.

The mist suppressant of the invention is made up of the organopolysiloxane (V) (i.e., crosslinked organopolysiloxane) obtained as described above or the foregoing siloxane composition.

The solventless silicone composition for release paper formulated with the mist suppressant of the invention is preferably an addition-curable silicone composition containing:
(A) 100 parts by weight of an organopolysiloxane having two or more silicon-bonded alkenyl groups per molecule,
(B) 0.1 to 30 parts by weight of an organohydrogenpolysiloxane having three or more silicon-bonded hydrogen atoms (SiH groups) per molecule,
(C) a catalytic amount of a platinum group metal catalyst,
(D) 0.01 to 20 parts by weight of the mist suppressant and, optionally,
(E) a reaction regulator.

The organopolysiloxane having two or more, and preferably from 2 to 50, alkenyl groups per molecule that serves as component (A) is preferably a linear organopolysiloxane that contains alkenyl groups at the ends and/or on side chains thereof and has general formula (4) below.

[Chemical Formula 1]

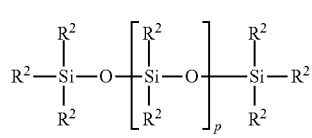

(4)

In formula (4), each $R^2$ is the same or a different group selected from among unsubstituted or substituted monovalent hydrocarbon groups of 1 to 12 carbon atoms that have no aliphatic unsaturated bonds and alkenyl groups represented by $-(CH_2)_q-CH=CH_2$ (wherein q is 0 or an integer from 1 to 6), with at least two of all the $R^2$ groups being alkenyl groups. The subscript p is from 1 to 1,000.

The unsubstituted or substituted monovalent hydrocarbon groups $R^2$ of 1 to 10 carbon atoms, and preferably 1 to 6 carbon atoms, that have no aliphatic unsaturated bonds are exemplified by alkyl groups such as methyl, ethyl, propyl, butyl, pentyl, hexyl, octyl, decyl and dodecyl groups; cycloalkyl groups such as a cyclohexyl group; aryl groups such as phenyl, naphthyl and tolyl groups; and any of these groups in which some portion of the hydrogen atoms bonded to carbon atoms are substituted with halogen atoms, cyano groups, hydroxyl groups or the like. However, to lower the peel strength, it is preferable for at least 50 mol % of the total number of $R^2$ groups to be methyl groups.

Also, at least 2, preferably from 2 to 50, and more preferably from 2 to 10, of all the $R^2$ groups are alkenyl groups.

The subscript p is from 1 to 1,000, and preferably from 10 to 300.

The organohydrogenpolysiloxane having three or more silicon-bonded hydrogen atoms (SiH groups) per molecule that serves as component (B) is preferably one having the following general formula (5).

[Chemical Formula 2]

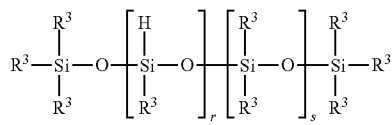

(5)

Here, each $R^3$ is an unsubstituted or substituted monovalent hydrocarbon group. Also, r is from 1 to 300, and s is from 0 to 150, these being present in a ratio that satisfies the condition r>s.

In formula (5), the $R^3$ groups are unsubstituted or substituted monovalent hydrocarbon groups of preferably 1 to 12 carbon atoms, and especially 1 to 6 carbon atoms, without aliphatic unsaturated bonds. Examples of such monovalent hydrocarbon groups include alkyl groups such as methyl, ethyl, propyl, butyl, pentyl, hexyl, octyl, decyl and dodecyl groups; cycloalkyl groups such as the cyclohexyl group; aryl groups such as phenyl and naphthyl groups; and halogen-substituted alkyl groups such as the 3,3,3-trifluoropropyl group.

Also, the subscript "r" is from 1 to 300, preferably 10 to 100, the subscript "s" is from 0 to 150, preferably 0 to 50, and r and s are present in a ratio such that r>s.

Component (B) is included in an amount, per 100 parts by weight of component (A), of preferably 0.1 to 30 parts by weight, and especially 0.1 to 20 parts by weight. The number of moles of silicon-bonded hydrogen atoms in the organohydrogenpolysiloxane (component (B)) with respect to the total number of moles of alkenyl groups in the alkenyl group-containing linear organopolysiloxane (component (A)), that is, the SiH group/alkenyl group ratio, is preferably from 1.5 to 2.5, and more preferably from 1.6 to 2.2. At a SiH group/alkenyl group ratio below 1.5, the cure may be incomplete, whereas at a ratio greater than 2.5, the change over time in the peel strength may increase.

The platinum group metal catalyst serving as component (C) may be a known catalyst that is used as an addition reaction catalyst. Examples of such platinum group metal catalysts include platinum-based, palladium-based, rhodium-based and ruthenium-based catalysts. Of these, the use of a platinum-based catalyst is especially preferred. Examples of such platinum-based catalysts include chloroplatinic acid, alcohol solutions or aldehyde solutions of chloroplatinic acid, and complexes of chloroplatinic acid with various olefins or vinylsiloxanes.

These platinum group metal catalysts are added in a catalytic amount, with the weight of the platinum group metal included with respect to the combined amount of components (A) and (B) being preferably from 10 to 1,000 ppm, and especially from 10 to 200 ppm.

Component (D) is the above-described mist suppressant. The amount of this mist suppressant included is preferably from 0.01 to 20 parts by weight, and especially 0.1 to 5 parts by weight, per 100 parts by weight of component (A). When the content of mist suppressant is too low, a mist suppressing effect may not be observable; on the other hand, when it is too high, the viscosity of the overall composition may become too high or the peel strength may depart from the target values.

The reaction regulator serving as component (E) is an optionally included ingredient for regulating the catalytic activity of the platinum group metal catalyst. It is exemplified by various types of organic nitrogen compounds, organophosphorus compounds, acetylene compounds, oxime compounds and organochloro compounds. Specific examples include acetylenic alcohols such as 3-methyl-1-butyn-3-ol, 3,5-dimethyl-1-hexyn-3-ol, 3-methyl-1-penten-3-ol and phenylbutynol; acetylene compounds such as 3-methyl-3-penten-1-yne and 3,5-dimethyl-1-hexyn-3-yne; reaction products of these acetylene compounds with an alkoxysilane or alkoxysiloxane or with a hydrogensilane or hydrogensiloxane; vinylsiloxanes such as tetramethylvinylsiloxane cyclics; organic nitrogen compounds such as benzotriazoles; and also organophosphorus compounds, oxime compounds, organochloro compounds, etc.

When included, the amount of the reaction regulator (E) should be such that a good treatment bath stability is obtained, and in general may be set to from 0 to 3 wt %, and especially 0.01 to 3 wt %, of the total amount of the composition, with a content of 0.01 to 3 parts by weight per 100 parts by weight of component (C) being preferred.

The mist suppressor-containing, solventless silicone composition for release paper may also include the following optional ingredients, within a range that does not detract from the objects of the invention: antioxidants, pigments, stabilizers, antistatic agents, foam inhibitors, tackifiers, and inorganic fillers such as silica.

The mist suppressant-containing, solventless silicone composition for release paper can be prepared by uniformly mixing the above ingredients in the usual manner.

During actual use of the mist suppressant-containing, solventless silicone composition for release paper of the invention, the silicone composition for release paper may be coated, either as is or following dilution with a suitable organic solvent, to a weight of 0.01 to 100 g/m² onto a base material such as paper or plastic film using a method of application such as roll coating, reverse coating or gravure coating, and then heated at 50 to 200° C. for 1 to 120 seconds to form a cured film on the base material.

Here, examples of the base material include papers such as glassine, polyethylene laminate paper, kraft paper, clay-coated paper and mirror-coated paper; and plastic films made of polypropylene, polyethylene, polyethylene terephthalate, polyvinyl chloride or the like.

The mist suppressant of the invention does not impart any change whatsoever in the peel strength of the cured form of the solventless silicone composition for release paper.

EXAMPLES

Synthesis Examples, Working Examples and Comparative Examples are given below to more concretely illustrate the invention, although the invention is not limited by these Examples. The viscosities mentioned below are all values measured at 25° C. using a Brookfield rotational viscometer.

The symbols used in the following Examples to indicate siloxane compositions denote the following units.

M: $(CH_3)_3SiO_{1/2}$
$M^H$: $(CH_3)_2HSiO_{1/2}$
$M^{Vi}$: $(Cl_2=CH)(CH_3)_2SiO_{1/2}$
D: $(CH_3)_2SiO_{2/2}$
$D^H$: $(CH_3)HSiO_{2/2}$ $D^{Vi}$: $(CH_2=CH)(CH_3)SiO_{2/2}$
$T^{Vi}$: $(CH_2=CH)SiO_{3/2}$
Q: $SiO_{4/2}$

Synthesis Example 1

The linear methylhydrogenpolysiloxane represented by $M^H{}_2D_{29}$ (10 g) and 48 g of the linear vinylmethylpolysiloxane with branches represented by $M_2D^{Vi}{}_{1.4}D_{147}T^{Vi}{}_1$ (SiH groups:vinyl groups=1 mole:1.17 moles) were mixed together in 280 g of decamethylpentasiloxane (Ds), following which a platinum catalyst to which vinylmethylpolysiloxane was coordinated was added in an amount corresponding to a platinum weight of 2 ppm and the temperature was raised. Gelling occurred at 50 to 60° C., at which point the reaction was stopped, 200 ppm of KOH was added, and the equilibration reaction was carried out at 150° C. for 6 hours. The temperature was lowered to 80° C., after which neutralization was carried out by adding 0.2 g of ethylene chlorohydrin. The resulting product was a high-viscosity oil-like substance having a viscosity of 126,500 mPa·s. The amount of silethylene linkages per 1,000 moles of siloxane units, as determined by $^1$H-NMR analysis, was 1.9 moles.

Synthesis Example 2

The linear methylhydrogenpolysiloxane represented by $M^H{}_2D_{59}$ (4.1 g) and 12.24 g of the silicone resin represented by $M_{0.74}M^{Vi}{}_{0.08}Q_1$ (SiH groups:vinyl groups=1 mole:4.2 moles) were mixed together in 33.5 g of linear dimethylpolysiloxane represented by $M_2D_{79}$ and 25.2 g of decamethylpentasiloxane (Ds), following which a platinum catalyst to which vinylmethylpolysiloxane was coordinated was added in an amount corresponding to a platinum weight of 2 ppm and the temperature was raised. Gelling occurred at 50 to 60° C., at which point the reaction was stopped, 29.9 g of the linear divinyl-terminated dimethylpolysiloxane represented by $M^{Vi}{}_2D_{585.32}$ was added and stirring was thoroughly carried out. Next, 1,200 ppm of KOH was added, and the equilibration reaction was carried out at 150° C. for 6 hours. The temperature was lowered to 80° C., after which neutralization was carried out by adding 0.2 g of ethylene chlorohydrin. Vacuum concentration was then carried out at 150° C. and 2 mmHg for 2 hours. The resulting product was an oil-like substance having a viscosity of 1,550 mPa·s. The amount of silethylene linkages per 1,000 moles of siloxane units, as determined by $^1$H-NMR analysis, was 6.2 moles.

Synthesis Example 3

The linear dimethylhydrogenpolysiloxane represented by $M^H{}_2D_{31.97}$ (11 g) and 49.3 g of the linear vinylmethylpolysiloxane represented by $M_2D^{Vi}{}_{2.4}D_{150.4}$ (SiH groups:vinyl groups=1 mole:1.17 moles) were mixed together in 422 g of the linear dimethylpolysiloxane represented by $M_2D_{24}$, following which a platinum catalyst to which linear vinylmethylpolysiloxane was coordinated was added in an amount corresponding to a platinum weight of 2 ppm and the temperature was raised. Gelling occurred at 50 to 60° C., at which point the reaction was stopped, another 870 of the linear dimethylpolysiloxane represented by $M_2D_{24}$ was added thereto and the gel was stirred while being mashed in a homogenizing mixer at 2,000 rpm for 3 hours. The resulting product had a viscosity of 280 mPa·s, but a fine gel remained. The amount of silethylene linkages per 1,000 moles of siloxane units in the crosslinked product, as determined by $^1$H-NMR analysis, was 11.3 moles.

Synthesis Example 4

The gel-containing silicone oil synthesized in Synthesis Example 3 was filtered with filter paper. The yield of the resulting oil was about 20 wt % of the oil in Synthesis Example 3, and the viscosity was 41 mPa·s. Upon visual observation, no gel was observed therein.

Synthesis Example 5

The linear dimethylhydrogenpolysiloxane represented by $M_2D_{31.97}D^H{}_5$ (51 g) and 49 g of the linear vinylmethylpolysiloxane represented by $M_2D^{Vi}{}_4D_{148.56}$ (SiH groups:vinyl groups=1 mole:0.19 mole) were mixed together, following which a platinum catalyst to which linear vinylpolysiloxane was coordinated was added in an amount corresponding to a platinum weight of 2 ppm and the temperature was raised. After the reaction had been carried out at 90° C. for 3 hours, the amount of SiH groups was 0.085 mol/100 g and all of the vinyl groups had reacted. The volatile ingredients were then vacuum concentrated at 120° C. and 2 mmHg for 3 hours. The resulting silicone oil had a viscosity of 2,400 mPa·s.

The evolution of hydrogen gas over time by this silicone oil was confirmed. The amount of silethylene linkages per 1,000 moles of siloxane units, as determined by $^1$H-NMR analysis, was 74.4 moles.

When 50 g of the compounds from the respective Synthesis Examples were mixed together with 100 g of the compound of formula (6) below and 2 g of the compound of formula (7) below and stirred at 80° C., changes in viscosity were not observed for the compounds from Synthesis Examples 1 and 2, but gelling occurred in the systems in which the compounds of Synthesis Example 3, 4 and 5 had been mixed.

Working Examples 1 to 3, Comparative Examples 1 to 4

Various organopolysiloxane compositions were prepared as described below by adding the various mist suppressants produced in the Synthesis Examples to the base composition shown below, and the prepared compositions were cured.

The amount of mist generated, peel strength and subsequent adhesion ratio for the organopolysiloxane compositions were measured by the methods described below. The viscosity of the final composition was measured by the method described above. There were no problems with curability for any of the organopolysiloxane compositions.

<Method of Preparing Organopolysiloxane Composition>

Various organopolysiloxane compositions were prepared by using as the base composition 100 parts by weight of the dimethylpolysiloxane of formula (6) below

[Chemical Formula 3]

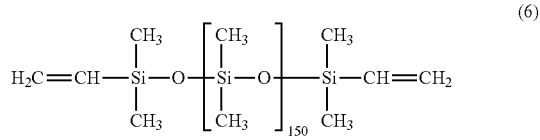

(6)

having vinyldimethylsiloxy groups at both ends, 2.7 parts by weight of the methylhydrogenpolysiloxane of formula (7) below

[Chemical Formula 4]

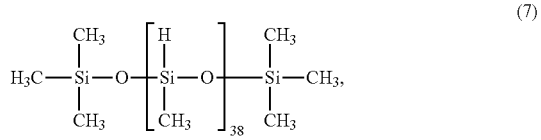

(7)

0.4 part by weight of ethynylcyclohexanol and 2 parts by weight of a complex salt of chloroplatinic acid and vinylsiloxane (platinum weight basis, 100 ppm), adding to this composition 1 or 2 parts by weight of the mist suppressants prepared in the above Synthesis Examples, and thoroughly stirring. The formulated compositions are shown in Table 1.

<Method of Measuring Amount of Mist Generated>

The test sample, 1.6 g, was coated onto the topmost roller in a Misting Tester (Toyo Seiki Seisaku-Sho, Ltd.), the three rollers were rotated at a speed of 1,400 rpm, and the amount of mist generated was measured with the DustTrak Aerosol Monitor, Model 8520, from TSI Incorporated. The mist was collected by positioning one opening of a vinyl tube having a 7 mm inside diameter 15 cm directly above the topmost roller, and connecting the other opening in the vinyl tube to the intake of the DustTrak. Measurement was carried out for 180 seconds and the maximum value was recorded. The maximum detection limit for the DustTrak is 150 mg/m$^3$. The results are shown in Table 1.

<Method of Curing the Organopolysiloxane Composition>

Following preparation, the organopolysiloxane composition was applied onto polyethylene laminate paper as the base material to a coating weight of 0.9 to 1.1 g/m$^2$, and heated for 30 seconds in a 140° C. hot air dryer. The resulting coated paper was used as the separator in the following measurements.

<Surface State of Coated Sample>

The surface of the silicone separator obtained by curing the organopolysiloxane composition by the above method was visually examined. Separators free of any coating problems were rated as "Good," and separators having surface irregularities or foreign matter were rated as "NG." The results are shown in Table 1

<Method of Measuring Peel Strength>

A test specimen was prepared by holding a silicone separator obtained by the curing method described above at 25° C. for 20 hours, then bonding TESA-7475 tape thereto and holding the separator with the attached tape for 20 hours in a 70° C. dryer under an applied load of 20 g/m$^2$. Using a tensile tester, the TESA-7475 tape was peeled from the specimen at an angle of 180° and a rate of 0.3 m/min. The force required to peel off the tape was measured and treated as the peel strength (N/25 mm). The results are shown in Table 1.

<Method of Measuring Subsequent Adhesion Ratio>

The TESA-7475 tape following the above peel test was attached to a stainless steel plate, and bonded under applied pressure by a single back-and-forth pass with a 2 kg tape roller, after which it was peeled off at an angle of 180° and a rate of 0.3 m/min using a tensile tester, and the force required for re-peeling was measured. The subsequent adhesion ratio was calculated as follows. The results are shown in Table 1.

Subsequent adhesion ratio (%)=(re-peel strength÷peel strength)×100

TABLE 1

| Contents of organopolysiloxane composition | | Working Example | | | Comparative Example | | | |
|---|---|---|---|---|---|---|---|---|
| (pbw) | | 1 | 2 | 3 | 1 | 2 | 3 | 4 |
| Mist suppressant | Synthesis Example 1 | 1 | 2 | — | — | — | — | — |
| | Synthesis Example 2 | — | — | 2 | — | — | — | — |
| | Synthesis Example 3 | — | — | — | 2 | — | — | — |
| | Synthesis Example 4 | — | — | — | — | 2 | — | — |
| | Synthesis Example 5 | — | — | — | — | — | 2 | — |
| Dimethylpolysiloxane capped at both ends with vinyldimethylsiloxy groups | | 100 | 100 | 100 | 100 | 100 | 100 | 100 |
| Methylhydrogenpolysiloxane | | 2.7 | 2.7 | 2.7 | 2.7 | 2.7 | 2.7 | 2.7 |
| Ethynylcyclohexanol | | 0.4 | 0.4 | 0.4 | 0.4 | 0.4 | 0.4 | 0.4 |
| Complex salt of chloroplatinic acid and vinylsiloxane | | 2 | 2 | 2 | 2 | 2 | 2 | 2 |
| Evaluation Results | | | | | | | | |
| Amount of mist generated (maximum value for 180 seconds; mg/m$^3$) | | 28 | 15 | 35 | 38 | 125 | 91 | 150 |
| Surface state of coated sample | | good | good | good | NG | good | good | good |
| Peel strength (N/25 mm) | | 10 | 10 | 10 | 15 | 10 | 17 | 10 |
| Subsequent adhesion ratio (%) | | 97 | 96 | 96 | 89 | 95 | 95 | 97 |

The invention claimed is:

1. A solventless silicone composition for release paper, comprising:
   (A) 100 parts by weight of an organopolysiloxane having two or more silicon-bonded alkenyl groups per molecule,
   (B) 0.1 to 30 parts by weight of an organohydrogenpolysiloxane having three or more silicon-bonded hydrogen atoms per molecule,
   (C) a catalytic amount of a platinum group metal catalyst, and
   (D) 0.01 to 20 parts by weight of a mist suppressant comprising a crosslinked organopolysiloxane comprising an organopolysiloxane which contains 6.2 to 50 moles of silalkylene linkages per 1,000 moles of siloxane units and is obtained by adding, to a gel-like silicone prepared by hydrosilylation of an organopolysiloxane having a structure of formula (1) below with an organohydrogenpolysiloxane having a structure of formula (2) below $$M_\alpha M^{Vi}_\beta D_\gamma D^{Vi}_\delta T_\epsilon T^{Vi}_\zeta Q_\eta \quad (1)$$

$$M_\theta M^H_\iota D_\kappa D^H_\lambda T_\mu T^H_\nu \quad (2)$$

(wherein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$ and Q is $SiO_{4/2}$, each R being independently an unsubstituted or substituted monovalent hydrocarbon group of 1 to 12 carbon atoms that has no aliphatic unsaturated bonds and P being an alkenyl group represented by —$(CH_2)_a$—CH=$CH_2$ (where "a" is 0 or an integer from 1 to 6); and $\alpha$, $\beta$, $\gamma$, $\delta$, $\epsilon$, $\zeta$, $\eta$, $\theta$, $\iota$, $\kappa$, $\lambda$, $\mu$ and $\nu$ are each independently 0 or a positive number, with the provisos that $\beta$, $\delta$ and $\zeta$ are not all 0, $\beta+\delta+\zeta \geq 2$, $\iota$, $\lambda$ and $\nu$ are not all 0, and $\iota+\lambda+\nu \geq 2$), a compound having siloxane units of formula (3) below $$R^1_2SiO_{2/2} \quad (3)$$

(wherein each $R^1$ is the same or a different group selected from among monovalent hydrocarbon groups of 1 to 20 carbon atoms that have no aliphatic unsaturated bonds and alkenyl groups represented by —$(CH_2)_a$—CH=$CH_2$ (where "a" is 0 or an integer from 1 to 6); and an average degree of polymerization of the siloxane of formula (3) is from 3 to 2,000 in the compound having siloxane units of formula (3)) and carrying out equilibration.

2. The crosslinked organopolysiloxane of claim 1 wherein, in formula (1), $1 \leq \alpha+\gamma+\epsilon+\eta \leq 1,000$ and, in formula (2), $1 \leq \theta+\kappa+\mu \leq 200$.

3. The crosslinked organopolysiloxane of claim 2 wherein, in formula (1), $1 \leq \gamma \leq 1,000$ and, in formula (2), $1 \leq \kappa \leq 200$.

4. The crosslinked organopolysiloxane of claim 1, wherein the compound having siloxane units of formula (3) is an organosiloxane selected from among octamethyltetrasiloxane, decamethylpentasiloxane, linear siloxanes of the formula $M_2D_n$ (M being an $R_3SiO_{1/2}$ unit, D being an $R_2SiO_{2/2}$ unit, each R being independently an unsubstituted or substituted monovalent hydrocarbon group of 1 to 12 carbon atoms which has no aliphatic unsaturated bonds, and n being an integer from 0 to 200) and branched siloxanes of the formula $M_{2+m}D_nT_m$ (M, D and n being the same as above, T being an $RSiO_{3/2}$ unit, R being the same as above, and m being an integer from 1 to 10).

5. The crosslinked organopolysiloxane of claim 1, wherein the organopolysiloxane of formula (1) has a weight-average molecular weight of 260 to 74,186 and the organohydrogenpolysiloxane of formula (2) has a weight-average molecular weight of 208 to 14,934.

* * * * *